United States Patent [19]

Ermacora

[11] Patent Number: 4,771,591
[45] Date of Patent: Sep. 20, 1988

[54] ROTARY CUTTER SUPPORT FOR A MOWING MACHINE

[75] Inventor: Rino Ermacora, Saverne, France

[73] Assignee: Kuhn, S.A., Cedex, France

[21] Appl. No.: 39,162

[22] Filed: Apr. 17, 1987

[30] Foreign Application Priority Data

Apr. 17, 1986 [FR] France ............................ 86 05680

[51] Int. Cl.⁴ .......................................... A01D 34/62
[52] U.S. Cl. ........................................ 56/13.6; 56/6
[58] Field of Search ................ 56/6, 13.6, 192, 60, 56/235, 295

[56] References Cited

U.S. PATENT DOCUMENTS

| | | | |
|---|---|---|---|
| 3,070,938 | 1/1963 | Winget | 56/13.6 X |
| 3,469,378 | 9/1969 | Heesters et al. | 56/13.6 X |
| 3,965,658 | 6/1976 | Van der Lely | 56/192 |

FOREIGN PATENT DOCUMENTS

| | | |
|---|---|---|
| 0009134 | 4/1980 | European Pat. Off. . |
| 2418154 | 4/1974 | Fed. Rep. of Germany . |
| 2089224 | 1/1972 | France . |
| 2171674 | 9/1973 | France . |
| 2089634 | 6/1982 | United Kingdom . |

Primary Examiner—Stephen F. Husar
Attorney, Agent, or Firm—Oblon, Fisher, Spivak, McClelland & Maier

[57] ABSTRACT

A mower comprising at least one mowing unit 1 provided with a cutting bar 2 on the upper face 8 of which are placed a plurality of cutting elements 5, 6, and 7 mounted to rotate around axes 15 directed upwardly with the aid of a plurality of shafts 9, 10, and 11 guided in rotation in a housing 4 of the cutting bar 2. A support structure 3 is placed at a certain distance above the cutting bar 2 and is connected to the cutting bar 2. The support structure 3 includes a beam 28 extending crosswise to the direction of advance of the mowing unit during use. The beam 28 is connected to a strut 29 extending downwardly in the direction of a cutting element 7. The strut 29 is connected to the shaft 11 by a bearing 132. The bearing 132 includes a cylindrical guide 31, 32 the axis of which is merged with the axis 15 of the shaft 11. A connecting device 35 connects the strut 29 to the beam 28. The connecting device 35 includes a joint 36 having an axis 37 directed at least approximately perpendicularly to the plane containing the axes of rotation 15 of the cutting elements 5, 6 and 7.

28 Claims, 4 Drawing Sheets

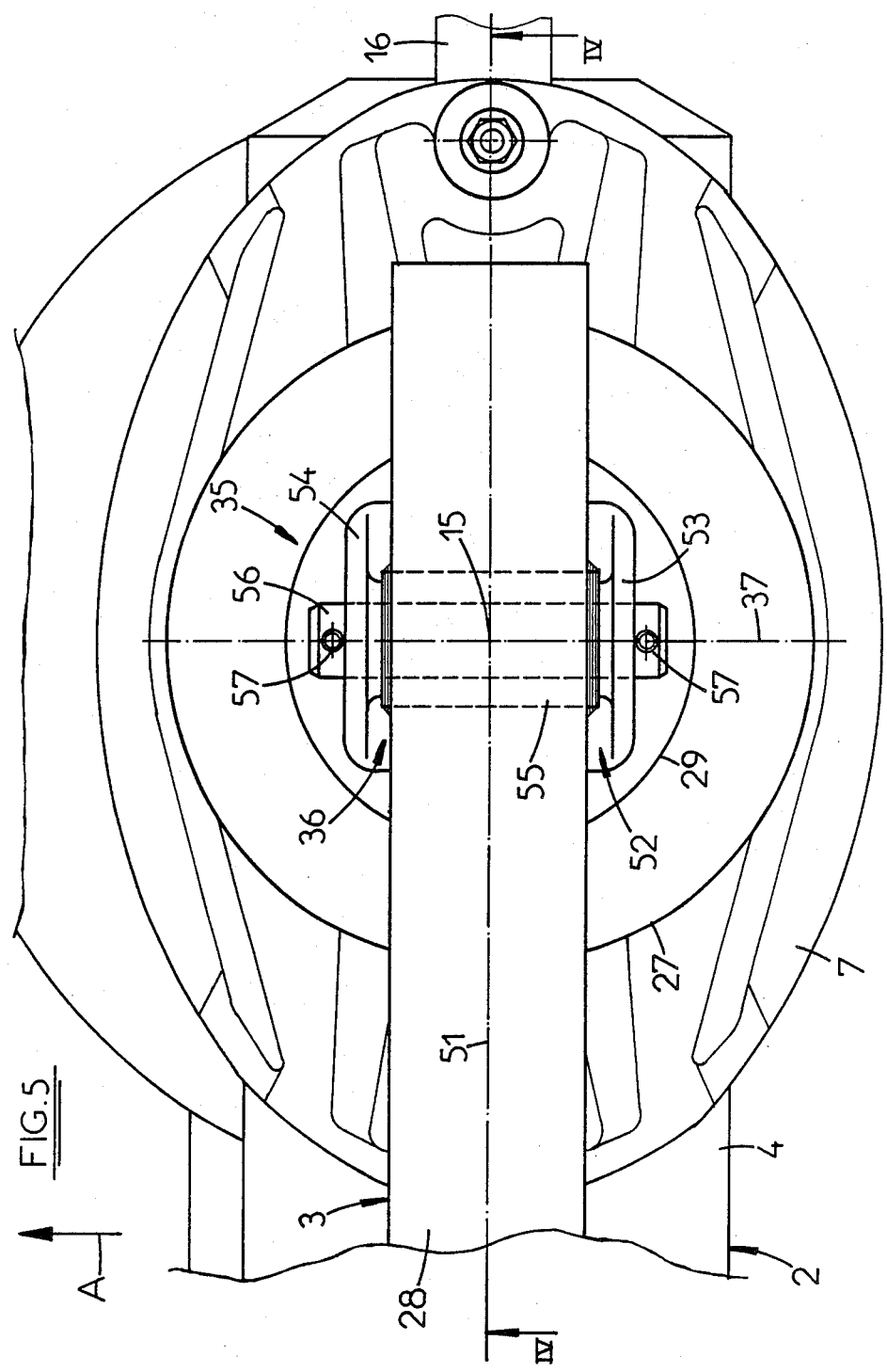

ROTARY CUTTER SUPPORT FOR A MOWING MACHINE

FIELD OF THE INVENTION

This invention relates to a mower having at least one mowing unit provided with a cutting bar on the upper face of which are placed cutting elements mounted to rotate around axes directed upwardly, with the aid of shafts guided in rotation in the houing of the cutting bar. A support structure is placed above the cutting bar and is connected to the cutting bar. The support structure includes a beam extending crosswise to the direction of advance. A strut is connected to the beam and extends downwardly in the direction of a cutting element of the cutting bar, and the strut is connected to the shaft of the cutting element by a bearing.

BACKGROUND OF THE INVENTION

Such a mower is known in which the bearing by which the strut of the support structure is connected to the shaft of the outboard cutting element located at the corresponding end of the cutting bar which is guided in the housing of the cutting bar by two roller bearings consists of a self-aligning roller bearing. In this known mower, the strut of the support structure is rigidly connected to one of the ends of the beam of the support structure. At its other end, the beam of the support structure is connected to a transmission device which extends above the cutting element placed at the corresponding end of the cutting bar and called the inboard cutting element. The shaft of the inboard cutting element, which is also guided in rotation in the housing of the cutting bar, is extended upwardly and penetrates into the transmission device, where it is guided in rotation by two other roller bearings. This shaft serves to drive the inboard cutting element and to transmit the movement from the transmission device to the drive elements housed on the inside of the housing of the cutting bar and serving to drive in rotation the following cutting elements. The shaft also serves to connect the housing of the cutting bar to the transmission device, just like the shaft of the outboard cutting element which serves to connect the housing to the strut of the support structure.

The known mower has drawbacks.

A first drawback of the known mower relates to the unequal distribution of the absorption of forces and shocks exerted on the housing during work. During work, the housing of the mower slides over the ground. Consequently, it is subjected to a force of resistance to advance which is directed horizontally from the front to the back and which varies continuously, since the terrain on which the mower operates is never rigorously plane. This force even at times is transformed into shocks when the housing encounters an obstacle on the ground. Now, since the end of the cutting bar where the strut of the support structure extends is connected to the strut by means of a self-aligning roller bearing, the moment which tends to make the housing of the cutting bar pivot backwardly, produced by this force of resistance to advance and the shocks in case of encountering an obstacle, is absorbed entirely by the roller bearings guiding the shaft of the first cutting element extending under the transmission device and which penetrates inside the transmission device. As a result, the roller bearings have a relatively short life.

A second drawback of the known mower resides in the difficulty of mounting the support structure on the cutting bar. The housing of the cutting bar is made from bent sheet metal, while the support structure is made by welding. It follows that the necessary production tolerances must be relatively large. Further, these elements can exhibit a certain initial deformation. Thus, during mounting of the support structure on the cutting bar, it is necessary to deform the cutting bar (which is the more flexible element) so that, from the beginning, not inconsiderable stresses are introduced into the roller bearings that guide in rotation the shafts of the end cutting elements.

This known mower also has a third drawback. The self-aligning bearing and a part of the strut of the support structure extend on the inside of a drum placed above the outboard cutting element. The self-aligning bearing, which connects the shaft of the outboard cutting element and of the drum to the strut, requires a relatively large space between the upper face of the drum and the strut. Plant debris and dust can thus be introduced inside the drum. When the mass of plant debris and dust becomes great, imbalances are produced which increase the load on the self-aligning bearing. Further, frictions are produced which heat the self-aligning bearing so that its life is considerably shortened.

Another mower is known the support structure of which is provided with two struts located on each of its ends. These struts extend downwardly in the direction of the cutting elements extending at the corresponding ends of the cutting bar. These struts are each connected to the shafts of end cutting elements which are guided in the housing of the cutting bar by two roller bearings by means of a bearing having two roller bearings with an axis of rotation merged with the axis of the shaft of the corresponding cutting elements. The shaft of each end cutting element extends to the level of the beam of the support structure, where it engages by means of gears with a drive shaft guided in rotation inside of the beam of the support structure. The shafts of the end cutting elements serve to drive in rotation their cutting element and, additionally, a certain number of the following cutting elements thanks to driving elements housed on the inside of the housing of the cutting bar. Simultaneously these shafts also serve to connect the housing of the cutting bar to the support structure.

This other known mower also has drawbacks.

A first drawback of this known mower also resides in the difficulty in mounting the support structure on the cutting bar. Considering the relatively large production tolerances required by the methods of production of the cutting bar and support structure, it is also necessary to deform the cutting bar (which is the most flexible element) to be able to cause the axes of the shafts of the end cutting elements guided in the struts of the support structure to correspond with the axes of the bearings of the cutting bar in which the ends of the shafts of the end cutting elements are supposed to penetrate.

A second drawback of this other known mower resides in the extremely great stresses which the roller bearings, which guide the shafts of the end cutting elements in rotation, are made to absorb during work. As with the first known mower, during work the housing of the cutting bar slides on the ground, which exhibits more or less great unevennesses. This leads to forces directed upwardly on the housing of the cutting bar which cause bending of the housing. During this bending, the housing pulls on the ends of the shafts of the end cutting elements with a very substantial force, considering the direction of this force in relation to the direction of the forces that generate it. This very substantial force is absorbed entirely by the roller bearings which guide the shafts of the end cutting elements in rotation. Consequently, the roller bearings also have a relatively short life.

The mowers of the prior art thus cause very high repair costs for the farmers, who do not accept them easily. In addition, if the roller bearings break during the season, they can lose a great part (even all) of their harvest, which would be a catastrophe for many of them.

OBJECT OF THE INVENTION

The object of this invention is to remedy or, at least, ameliorate the drawbacks of the previously described known mowers.

SUMMARY OF THE INVENTION

For this purpose, the mower according to the invention is characterized by the fact that the bearing which connects the strut to the shaft of a cutting element consists of a cylindrical guide the axis of which is merged with the axis of the shaft of the cutting element. The connecting device connecting the strut to the beam comprises a cylindrical joint having an axis directed at least approximately perpendicularly to the plane containing the axes of rotation of the cutting elements.

Thanks to this characteristic, the roller bearings—which guide in rotation the shafts of the cutting elements by means of which the housing of the cutting bar is connected, on the one hand, to the transmission device and, on the other hand, to the support structure—have a substantially increased life, since, on the one hand, the distribution of the force generated by the resistance to advance is more balanced and, on the other hand, the forces generated by the bending of the cutting bar upwardly due to the unevenness of the ground are much slighter.

GENERAL DISCUSSION OF THE INVENTION

In the first known mower the moment which tends to make the housing of the cutting bar pivot backwardly, produced by the force of resistance to advance which is directed horizontally from front to back, is absorbed solely by the roller bearings guiding the shaft of the first cutting element which extends under the transmission device. In contrast, in the mower according to the invention, this moment is taken by the roller bearings guiding the shafts of the two cutting elements in rotation by means of which the housing of the cutting bar is connected, on the one hand, to the transmission device and, on the other hand, to the support structure. The forces that are exerted on the roller bearings guiding the shaft of the first cutting element are thus substantially reduced, which will increase the life of these roller bearings.

Further, in the second known mower, the force directed upwardly that is exerted on the housing of the cutting bar generates a very great pull on the shafts of the end cutting elements which is absorbed entirely by the roller bearings guiding the shafts of these end cutting elements in rotation. In contrast, in the mower according to the invention, this pulling force is almost zero, since the strut can pivot in relation to the beam around the cylindrical joint with an axis directed at least approximately perpendicularly to the plane containing the axes of rotation of the cutting elements.

Advantageously, the axis of the cylindrical joint extends in the immediate vicinity of the axis of the shaft of the cutting element to which the strut is connected.

Preferably the axis of the cylindrical joint intersects the axis of the shaft of said cutting element.

According to another very important characteristic of the invention, the support structure comprises means for compensating for deformations and/or production tolerances of the cutting bar and/or of the support structure. Thanks to this characteristic, it is possible to adjust the support structure so that it can be mounted on the cutting bar without the latter having to be deformed, as is the case in mowers of the prior art. Thus, from the start the introduction of stresses is avoided in the roller bearings which guide the shaft of the cutting elements in rotation by means of which the housing of the cutting bar is connected, on the one hand, to the transmission device and, on the other hand, to the support structure.

Advantageously, these means for compensating for deformations and/or production tolerances have a structure permitting a compensation for the accumulated defects in a direction at least approximately parallel to the direction of the housing of the cutting bar. This characteristic makes possible a rather easy adaptation of the support structure to the shape of the cutting bar. The housing of the cutting bar often exhibits an initial deflection which causes the shaft of the cutting element to which the strut is connected not to be vertical. Thanks to the swivel connection between the beam and the strut of the support structure, the axis of the bearing defined by the strut can be made to coincide with the axis of the shaft of the cutting element. Causing the axis of the bearing defined by the strut to coincide with the axis of the shaft of the cutting element causes a movement of the support structure in relation to the corresponding part of the cutting bar where it is fastened, in a direction at least approximately parallel to the direction of the housing of the cutting bar. But, since the means for compensating for deformations and/or production tolerances allow such a movement, the support structure can be fastened to the corresponding part of the cutting bar without having to deform the cutting bar.

According to an additional characteristics of the mower according to the invention, it is also possible for the means for compensating for deformations and/or production tolerances to have a structure allowing a compensation for the accumulated defects in an at least approximately vertical direction.

According to an additional characteristic of the mower according to the invention, it is also possible for the means for compensating for deformations and/or production tolerances to have a structure allowing a compensation for accumulated defects in a horizontal direction at least approximately perpendicular to the direction of the housing of the cutting bar.

According to an additional characteristic of the mower according to the invention, it is also possible for the means for compensating for deformations and/or production tolerances to have a structure allowing a compensation for angular defects of the end of the support structure away from the strut.

With these additional characteristics, mounting of the support structure on the cutting bar is facilitated even more.

BRIEF DESCRIPTION OF THE DRAWINGS

FIG. 5 is a top view of the connection of the beam and the strut of the support structure.

DETAILED DESCRIPTION OF THE PRESENTLY PREFERRED EMBODIMENT

Figure 1:
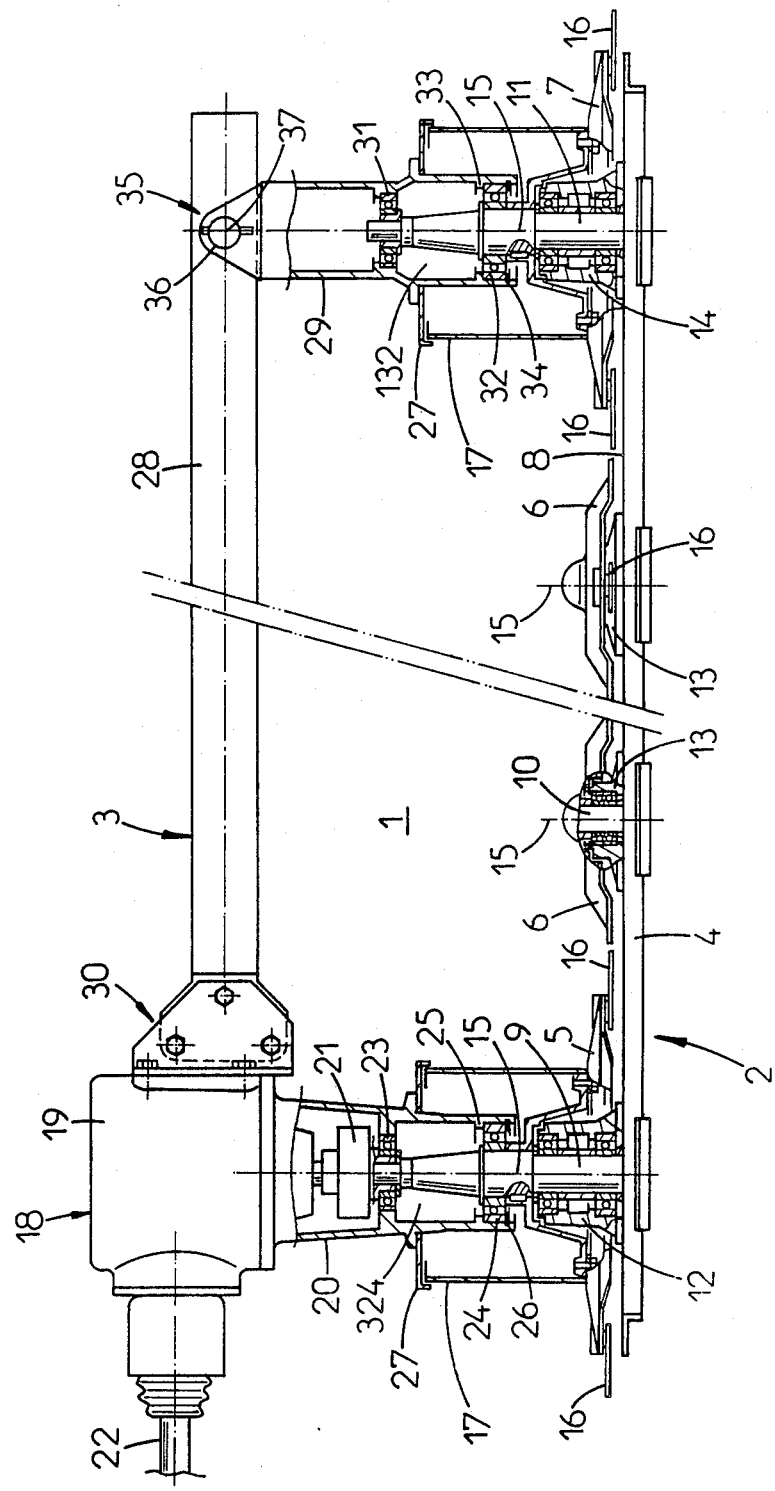
FIG. 1 is a back view, partially in section, of a mowing unit (cutting bar and support structure) of a mower according to the invention.

The mower of FIG. 1 comprises a mowing unit 1 provided with a cutting bar 2 having an upper face 8 and a support structure 3 the function of which is to stiffen the cutting bar 2.

The cutting bar 2 is made up of a housing 4 which supports a number of cutting elements, including an inboard cutting element 5, an outboard cutting element 7, and a certain number of intermediate cutting elements 6. The cutting elements 5, 6, and 7 extend to the upper face 8 of the housing 4. Each cutting element 5, 6, and 7 is mounted on a corresponding shaft 9, 10, and 11 which is guided in rotation in a corresponding roller bearing 12, 13, and 14 fastened to the upper face 8 of the housing 4. Each roller bearing 12, 13, and 14 also serves to connect axially the corresponding shaft 9, 10, and 11 to the housing 4. The cutting elements 5, 6, and 7 thus rotate around axes 15 directed upwardly and preferably at least approximately vertically.

Each cutting element 5, 6, and 7 is provided with a number of cutting tools 16. Each of the two end cutting elements 5 and 7 is surmounted by a drum 17. The drums 17 rotate with the two end cutting elements 5 and 7 and thus serve to reduce the width of the cut crop windrows deposited behind the cutting bar 2.

Driving in rotation of the cutting elements 5, 6, and 7 is produced by driving elements (not shown) housed, in a way known in the art, inside of the housing 4 of the cutting bar 2. Driving in rotation of the driving elements is achieved by the shaft 9 of the inboard cutting element 5. For this purpose, the shaft 9 is extended upwardly and penetrates into a transmission device 18 comprising a case 19 and a barrel 20 extending from the case 19 downwardly in the direction of the inboard cutting element 5. The case 19 contains, in a way known in the art, transmission elements which are coupled to the upper end of the shaft 9 of the inboard cutting element 5 by means of an elastic coupling 21. The transmission elements housed on the inside of the transmission device 18 are themselves driven in rotation by a Cardan joint 22 coupled, in a way known in the art, to the power takeoff of the tractor vehicle (not shown) to which the mower is hitched during work.

In FIG. 1, it is further seen that the upper part of the shaft 9 of the inboard cutting element 5 is guided in rotation in the barrel 20 by means of a bearing 324 formed by two roller bearings 23 and 24. The bearing 324 thus constitutes a cylindrical guide for the shaft 9. Moreover, it is also seen that the shaft 9 is axially connected in the barrel 20 by means of the lower roller bearing 24 which, on the one hand, strikes against a shoulder 25 of the barrel 20 and, on the other hand, against a circlip 26 mounted in the barrel 20. Finally, it is seen that the barrel 20 is also provided with a flange 27 which closes the upper part of the drum 17 extending above the inboard cutting element 5.

The support structure 3 extends at a certain distance above the housing 4 of the cutting bar 2. The support structure 3 is made up of a beam 28 and a strut 29. The beam 28 extends at least approximately parallel to the housing 4, while the strut 29 extends downwardly in the direction of the outboard cutting element 7. The beam 28 and the strut 29 thus extend at least approximately in the plane containing the axes of rotation 15 of the cutting elements 5, 6, and 7. The support structure 3 is fastened by its two ends to the two ends of the cutting bar 2. The end of the beam 28 away from the strut 29 (i.e., the inboard end of the beam 28) is fastened to the case 19 of the transmission device 18 by means of a fastening device 30 which will be described below, while the strut 29 is connected to the shaft 11 of the outboard cutting element 7. For this purpose, the shaft 11 of the outboard cutting element 7 is extended upwardly and penetrates into the inside of the strut 29. The connection between the strut 29 and the upper part of the shaft 11 is achieved by means of a bearing 132 formed by two roller bearings 31 and 32. The bearing 132 thus constitutes a cylindrical guide for the shaft 11. The axis of this cylindrical guide is thus merged with the axis 15 of the shaft 11. Moreover, it is also seen that the shaft 11 is connected axially in the strut 29 by means of the lower roller bearing 32 which, on the one hand, strikes against a shoulder 33 of the strut 29 and, on the other hand, against a circlip 34 mounted on the strut 29. Finally, it is also seen that the strut 29 is also provided with a flange 27 which closes the upper part of the drum 17 extending above the outboard cutting element 7.

Besides their function of reducing the width of the cut crop windrows deposited behind the cutting bar 2, the drums 17 also keep cut crop strands from being hooked to the barrel 20 and/or to the strut 29.

The connection between the beam 28 and the strut 29 is made by means of a connecting device 35 which will be described in greater detail below. The connecting device 35 is made up mainly of a cylindrical joint 36 the axis 37 of which is at least approximately perpendicular to the plane containing the axes of rotation 15 of the cutting elements 5, 6, and 7. Additionally, the axis 37 intersects the axis 15 of the shaft 11 of the outboard cutting element 7.

Figure 2:
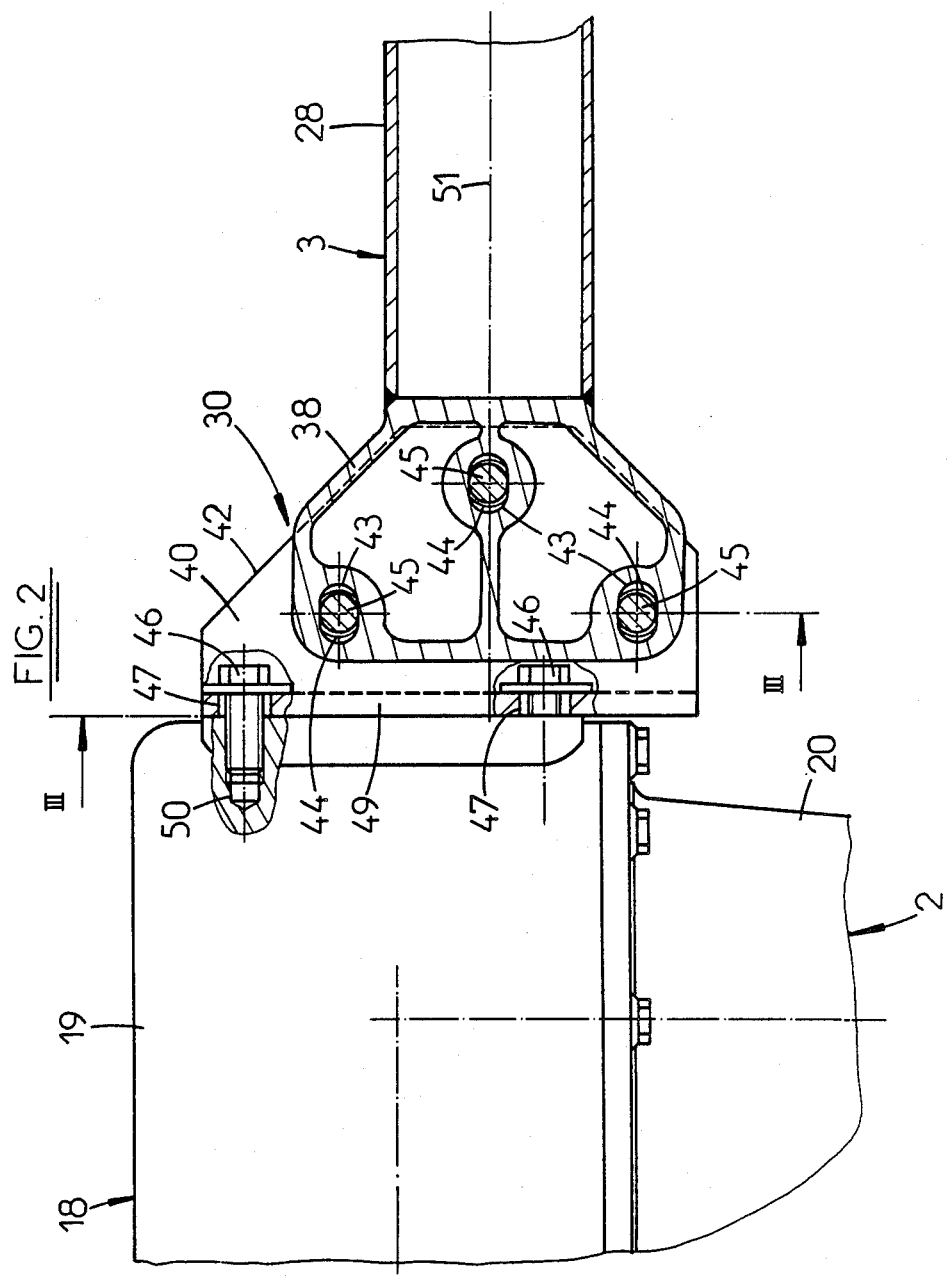
FIG. 2 is a back view, partially in section along plane II—II in FIG. 3, of the fastening of the support structure to the cutting bar at the end of the cutting bar where the transmission device of the cutting bar extends.
Figure 3:
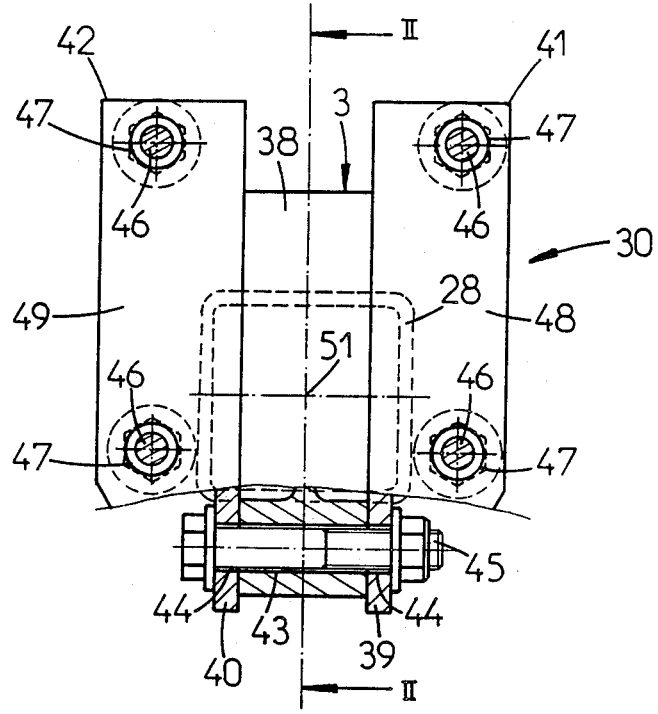
FIG. 3 is a view in section along plane III—III in FIG. 2 of the fastening of the support structure to the cutting bar at the end of the cutting bar where the transmission device of the cutting bar extends.

FIGS. 2 and 3 show in greater detail the connecting device 30 for fastening of the support structure 3 to the cutting bar 2—or, more precisely, to the case 19 of the transmission device 18 of the cutting bar 2. For this purpose, the end of the beam 28 located opposite the case 19 comprises a beam head 38 which extends between one of wings 39 and 40 of two brackets 41 and 42. The beam head 38 is provided with three holes 43. The holes 43 are oblong, having a long axis extending at least approximately in a direction parallel to the direction of the housing 4 of the cutting bar 2. Holes 44 made in the wings 39 and 40 of the brackets 41 and 42 extend opposite the oblong holes 43 made in the beam head 38. In the embodiment shown, the holes 44 are round. Nevertheless, within the context of the invention, just like the holes 43, the holes 44 could also be oblong in a direction parallel to the direction of the housing 4 of the cutting bar 2. The holes 43 and 44 are passed through by bolts 45 which make it possible to fasten the beam head 38 to the brackets 41 and 42.

Thanks to the oblong holes 43, the beam head 38 and, consequently, the beam 28 of the support structure 3 can be fastened to the case 19 of the transmission device 18 of the cutting bar 2 even if the beam head 38 is offset in a direction at least approximately parallel to the direction of the housing 4 of the cutting bar 2 on either side of its theoretical position. The oblong holes 43 make it possible to cause the length of the support structure 3 to vary between the cylindrical joint 36 and the end of the support structure 3 away from the strut 29. The brackets 41 and 42 are fastened to the case 19 by bolts 46 which go through holes 47 made in wings 48 and 49 of the brackets 41 and 42 and which are screwed into threaded holes 50 made in the case 19. In the embodiment shown, each bracket 41 and 42 is fastened to the case 19 by means of two bolts 46. In FIGS. 2 and 3, it is also seen that the holes 47 made in the wings 48 and 49 of the brackets 41 and 42 have a greater diameter than the diameter of the bolts 46. The brackets 41 and 42 and, consequently, the beam head 38 of the beam 28 of the support structure 3 can therefore be fastened to the case 19 of the transmission device 18 of the cutting bar 2 even if the end of the beam 28 where the beam head 38 and the brackets 41 and 42 extend is offset in a direction at least approximately vertical and/or in a horizontal direction at least approximately perpendicular to the direction of the housing 4 of the cutting bar 2 on either side of its theoretical position. Likewise, fastening is also possible even if the beam 28 is slightly twisted around its longitudinal axis 51.

Figure 4:
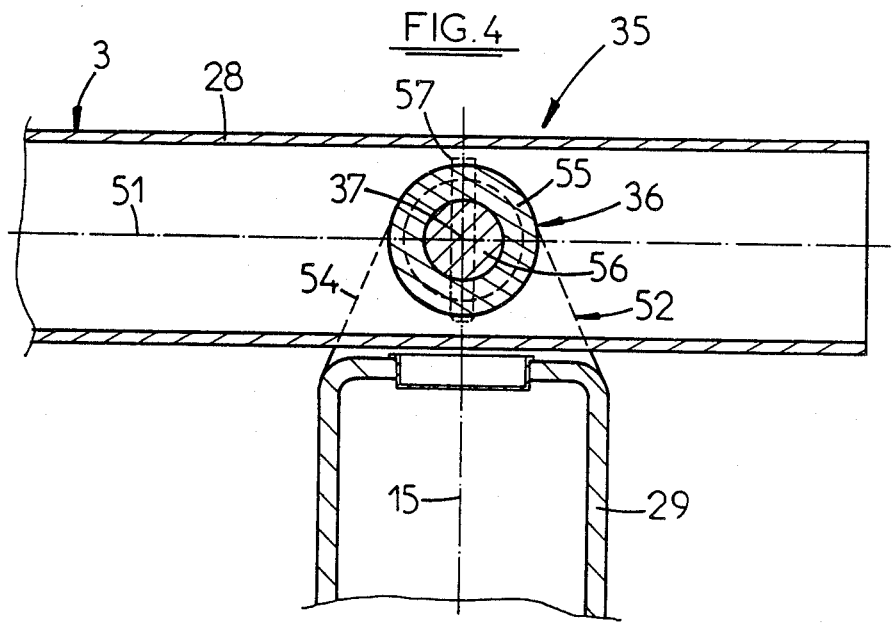
FIG. 4 is a view in section along plane IV—IV in FIG. 5 of the connection of the beam and of the strut of the support structure.

FIGS. 4 and 5 show in greater detail the connecting device 35 between the beam 28 and the strut 29 of the support structure 3. As said above, the connecting device 35 is made up mainly of a cylindrical joint 36, the axis 37 of which is at least approximately perpendicular to the plane containing the axes of rotation 15 of the cutting elements 5, 6, and 7. For this purpose, the upper part of the strut 29 is provided with a clevis 52 comprising two wings 53 and 54 between which the beam 28 extends. The beam 28 is provided with a ring 55 so that the beam 28 can be connected to the strut 29 by means of a pin 56 which goes through the two wings 53 and 54 of the clevis 52 and the ring 55 of the beam 28. Once mounted, the axial movement of the pin 56 is locked by two pins 57.

Mounting of the support structure 3 on the cutting bar 2 is performed in the following way. The strut 29 of the support structure 3 is first premounted on the shaft 11 of the outboard cutting element 7 by means of the roller bearings 31 and 32 and the circlip 34. Then the beam 28 is connected to the strut 29 by means of the pin 56. Then the brackets 41 and 42 are fastened to the beam head 38 by means of the bolts 45—however, without tightening the bolts 45 completely. Then the brackets 41 and 42 are brought in contact with the case 19 and fastened with the bolts 46. Finally, the bolts 45 are locked to fasten the beam head 38 solidly to the brackets 41 and 42.

This mounting of the support structure 3 on the cutting bar 2 is possible without introducing initial stresses in the roller bearings which guide the shafts 9 and 11 of the end cutting elements 5 and 7 in rotation even if the housing 4 of the cutting bar 2 and/or the beam 28 are more or less deformed or if their dimensions are at the end tolerance limits. If the housing 4 is deformed, then the axis 15 of the shaft 11 of the outboard cutting element 7 is not rigorously parallel to the axis 15 of the shaft 9 of the inboard cutting element 5. However, mounting is still possible thanks to the fact that the support structure 3 comprises means for compensating for deformations and/or production tolerances—specifically, the cylindrical joint 36, the oblong holes 43 in the beam head 38, and the holes 47 in the brackets 41 and 42 having a diameter greater than the diameter of the bolts 46 that go through them. Thus, the angle between the strut 29 and the beam 28 can be modified and the end of the beam 28 away from the strut 29 can occupy a position different from its theoretical position, while being able to be fastened to the transmission device 18. This real position of the end of the beam 28 can be offset in relation to its theoretical position:

(a) in a direction approximately parallel to the direction of the housing 4 of the cutting bar 2 (thanks to the oblong holes 43); and/or (b) in a direction at least approximately vertical (thanks to the holes 47 in the brackets 41 and 42); and/or (c) in a horizontal direction at least approximately perpendicular to the direction of the housing 4 of the cutting bar 2 (thanks to the holes 47); and/or (d) angularly (thanks to the holes 47).

During work, the mower is hitched to a tractor vehicle which pulls it in the direction A in FIG. 5 and which drives the cutting elements 5, 6, and 7 in rotation. During work, the mowing unit 1 of the mower slides over the ground by means of the housing 4 of the cutting bar 2. Considering the weight with which the housing 4 rests on the ground, during the sliding movement a resistance force to the sliding develops which can be relatively great in certain cases, considering the configuration of the ground on which the housing 4 slides. This force of resistance to sliding is absorbed, in the mower of the invention, by the roller bearings guiding shafts 9 and 11 of the two end cutting elements 5 and 7.

Moreover, when the housing 4 of the cutting bar 2 is deformed upwardly during passage over a bump, the forces on the roller bearings guiding shaft 9 of the inboard cutting element 5 due to this deformation remain relatively slight, since the strut 29 can pivot in relation to the beam 28 around the axis 37 of the cylindrical joint 36.

The life of the roller bearings guiding shaft 9 of the inboard cutting element 5 is thus substantially increased.

Various modifications can be made to the embodiment described without thereby going outside the scope of this invention.

What is claimed as new and desired to be secured by letters patent of the United States is:

1. A mower comprising at least one mowing unit provided with a cutting bar on the upper face of which are placed a plurality of cutting elements mounted to rotate around axes directed upwardly with the aid of a plurality of shafts guided in rotation in a housing of said cutting bar and a support structure placed at a certain distance above said cutting bar and connected to said cutting bar, said support structure comprising a beam extending crosswise to the direction of advance of said mowing unit during use, said beam being connected to a strut extending downwardly in the direction of one of said plurality of cutting elements, said strut being connected to the corresponding one of said plurality of shafts by a bearing, said bearing comprising a cylindrical guide the axis of which is merged with the axis of said corresponding one of said plurality of shafts, a connecting device connecting said strut to said beam, said connecting device comprising a cylindrical joint having an axis directed at least approximately perpendicular to the plane containing the axes of rotation of said plurality of cutting elements.

2. A mower according to claim 1 wherein the axis of said cylindrical joint extends in the immediate vicinity of the axis of said corresponding one of said plurality of shafts.

3. A mower according to claim 2 wherein the axis of said cylindrical joint intersects the axis of said corresponding one of said plurality of shafts.

4. A mower according to claim 1 wherein:
 (a) said support structure is connected at its ends to the ends of said cutting bar and
 (b) said strut is connected to one of the ends of said beam and extends downwardly in the direction of the outboard one of said plurality of cutting elements.

5. A mower according to claim 1 wherein said cylindrical joint comprises:
 (a) a clevis mounted on the upper part of said strut, between wings from which said beam extends, and
 (b) a pin going through said wings of said clevis and said beam.

6. A mower according to claim 1 wherein:
 (a) said beam extends at least approximately parallel to said housing of said cutting bar and
 (b) said beam and said strut extend at least approximately in the plane containing the axes of rotation of said plurality of cutting elements.

7. A mower according to claim 1 wherein said support structure comprises means for compensating for deformations and/or production tolerances of said cutting bar and/or of said support structure, said means allowing mounting of said support structure on said cutting bar.

8. A mower according to claim 7 wherein said means for compensating for deformations and/or production tolerances have a structure permitting compensation for accumulated defects in a direction at least approximately parallel to the direction of said housing of said cutting bar.

9. A mower according to claim 7 wherein said means for compensating for deformations and/or production tolerances have a structure permitting compensation for accumulated defects in a direction at least approximately vertical.

10. A mower according to claim 7 wherein said means for compensating for deformations and/or production tolerances have a structure permitting compensation for accumulated defects in a horizontal direction at least approximately perpendicular to the direction said housing of said cutting bar.

11. A mower according to claim 7 wherein said means for compensating for deformations and/or production tolerances have a structure permitting compensation for angular defects of the ends of said support structure away from said strut.

12. A mower according to claim 7 wherein said means for compesating for deformations and/or production tolerances comprise intermediate parts.

13. A mower according to claim 12 wherein said intermediate parts extend between the end of said beam away from said strut and the corresponding part of said cutting bar.

14. A mower according to claim 12 wherein said intermediate parts have a structure making it possible to vary the length of said support structure between said cylindrical joint and the end of said support structure away from said strut.

15. A mower according to claim 14 wherein said intermediate parts are fastened to said beam by means of bolts simultaneously going through first holes made in said intermediate parts and second holes made in said beam, said second holes and/or said first holes having a shape which makes it possible to cause the length of said support structure to vary in a direction at least approximately parallel to the direction of said housing of said cutting bar.

16. A mower according to claim 15 wherein said holes having said shape are made only in said beam.

17. A mower according to claim 15 wherein said holes having said shape are oblong holes extending at least approximately in a direction parallel to the direction of said housing of said cutting bar.

18. A mower according to claim 12 wherein said intermediate parts are fastened to said cutting bar by means of bolts going through holes made in said intermediate parts and screwed in threaded holes made in said cutting bar.

19. A mower according to claim 18 wherein said holes have a shape which allows an offsetting of said itermediate parts in relation to said threaded holes in a direction at least approximately vertical.

20. A mower according to claim 19 wherein said holes have a larger dimension than the diameter of said bolts.

21. A mower according to claim 18 wherein said holes have a shape which allows an offsetting of said intermediate parts in relation to said threaded holes in a horizontal direction at least approximately perpendicular to the direction of said housing of said cutting bar.

22. A mower according to claim 21 wherein said holes have a larger dimension than the diameter of said bolts.

23. A mower according to claim 18 wherein said holes have a shape which allows an angular offsetting of said intermediate parts in relation to said threaded holes at least approximately around the longitudinal axis of said beam.

24. A mower according to claim 23 wherein said holes have a larger dimension than the diameter of said bolts.

25. A mower according to claim 12 wherein said intermediate parts comprise a pair of brackets.

26. A mower according to claim 1 wherein the end of said beam away from said strut is fastened to a transmission device fastened to said cutting bar and serving to drive said plurality of cutting elements in rotation.

27. A mower according to claim 26 wherein:
 (a) said transmission device extends above one of said plurality of cutting elements and
 (b) the driving of said plurality of cutting elements in rotation is performed by the corresponding one of said plurality of shafts going through said one of said plurality of cutting elements and coupling said transmission device to driving elements housed in said housing of said cutting bar.

28. A mower according to claim 26 wherein said transmission device is fastened to one of the ends of said cutting bar.

* * * * *